(12) United States Patent
Locke et al.

(10) Patent No.: US 10,509,990 B2
(45) Date of Patent: Dec. 17, 2019

(54) RADIO-FREQUENCY IDENTIFICATION-BASED SHELF LEVEL INVENTORY COUNTING

(71) Applicant: Facebook, Inc., Menlo Park, CA (US)

(72) Inventors: Stephen Edward Locke, Redwood City, CA (US); Ramkumar Kasimani, Saratoga, CA (US)

(73) Assignee: Facebook, Inc., Menlo Park, CA (US)

( * ) Notice: Subject to any disclaimer, the term of this patent is extended or adjusted under 35 U.S.C. 154(b) by 44 days.

(21) Appl. No.: 15/849,276

(22) Filed: Dec. 20, 2017

(65) Prior Publication Data

US 2019/0188545 A1 Jun. 20, 2019

(51) Int. Cl.
*G06F 19/00* (2018.01)
*G06Q 30/00* (2012.01)
*G06K 17/00* (2006.01)
*G06Q 10/08* (2012.01)
*G06Q 90/00* (2006.01)
*G06K 7/10* (2006.01)

(52) U.S. Cl.
CPC ....... *G06K 17/0029* (2013.01); *G06Q 10/087* (2013.01); *G06Q 90/00* (2013.01); *G06K 7/10297* (2013.01); *G06K 7/10425* (2013.01)

(58) Field of Classification Search
CPC .......... G06K 19/0722; G06K 19/0723; G06K 17/0022; G06K 7/10425; G06K 7/10158; G06K 7/10316; G06K 17/0029; G06K 19/07749; G06K 2209/15; G06K 7/0008; G06K 7/10118; G06K 7/10297; G06K 7/10356; G06K 7/10366; G06K 7/10475; G06K 9/00744; G06K 9/3258; G06Q 10/087; G06Q 50/22; G06Q 30/0214; G06Q 20/204; G06Q 20/3224; G06Q 20/34; G06Q 20/4016; G06Q 90/00; G01S 5/0284; G01S 5/0247
See application file for complete search history.

(56) References Cited

U.S. PATENT DOCUMENTS

| | | | | |
|---|---|---|---|---|
| 10,163,046 B1* | 12/2018 | Ung | ................ | G06K 17/0022 |
| 2016/0026837 A1* | 1/2016 | Good | ................ | G06K 7/10425 |
| | | | | 340/539.13 |
| 2018/0137460 A1* | 5/2018 | Stiefel | ................ | G06K 19/0722 |

* cited by examiner

*Primary Examiner* — Thien T Mai
(74) *Attorney, Agent, or Firm* — Van Pelt, Yi & James LLP

(57) ABSTRACT

A radio frequency identification tag at a plurality of detection locations is detected and an expected location of the radio frequency identification tag is determined. A confidence level for each of the detection locations that detected the radio frequency identification tag is determined based on a relative location of the corresponding detection location as compared to the expected location. The determined confidence levels of the detection locations is analyzed to select at least one of the detection locations and an action based on the at least one selected detection location is performed.

20 Claims, 10 Drawing Sheets

Table 501

| Storage Location | X | Y | Z |
| --- | --- | --- | --- |
| A1 | 0 | 0 | 0 |
| A2 | 0 | 1 | 0 |
| A3 | 0 | 2 | 0 |
| B1 | 0 | 0 | 1 |
| B2 | 0 | 1 | 1 |
| B3 | 0 | 2 | 1 |
| C1 | 0 | 0 | 2 |
| C2 | 0 | 1 | 2 |
| C3 | 0 | 2 | 2 |
| D1 | 1 | 0 | 0 |
| D2 | 1 | 1 | 0 |
| D3 | 1 | 2 | 0 |
| E1 | 1 | 0 | 1 |
| E2 | 1 | 1 | 1 |
| E3 | 1 | 2 | 1 |
| F1 | 1 | 0 | 2 |
| F2 | 1 | 1 | 2 |
| F3 | 1 | 2 | 2 |

Table 502

| Storage Location | X | Y | Z |
| --- | --- | --- | --- |
| G1 | 2 | 0 | 0 |
| G2 | 2 | 1 | 0 |
| G3 | 2 | 2 | 0 |
| H1 | 2 | 0 | 1 |
| H2 | 2 | 1 | 1 |
| H3 | 2 | 2 | 1 |
| I1 | 2 | 0 | 2 |
| I2 | 2 | 1 | 2 |
| I3 | 2 | 2 | 2 |
| J1 | 3 | 0 | 0 |
| J2 | 3 | 1 | 0 |
| J3 | 3 | 2 | 0 |
| K1 | 3 | 0 | 1 |
| K2 | 3 | 1 | 1 |
| K3 | 3 | 2 | 1 |
| L1 | 3 | 0 | 2 |
| L2 | 3 | 1 | 2 |
| L3 | 3 | 2 | 2 |

Table 503

| Storage Location | X | Y | Z |
| --- | --- | --- | --- |
| M1 | 4 | 0 | 0 |
| M2 | 4 | 1 | 0 |
| M3 | 4 | 2 | 0 |
| N1 | 4 | 0 | 1 |
| N2 | 4 | 1 | 1 |
| N3 | 4 | 2 | 1 |
| O1 | 4 | 0 | 2 |
| O2 | 4 | 1 | 2 |
| O3 | 4 | 2 | 2 |
| P1 | 5 | 0 | 0 |
| P2 | 5 | 1 | 0 |
| P3 | 5 | 2 | 0 |
| Q1 | 5 | 0 | 1 |
| Q2 | 5 | 1 | 1 |
| Q3 | 5 | 2 | 1 |
| R1 | 5 | 0 | 2 |
| R2 | 5 | 1 | 2 |
| R3 | 5 | 2 | 2 |

Figure 5

Table 601

| Degree of Separation / Reduction in Confidence Level | X | Y | Z |
|---|---|---|---|
| 1 | 1% | 1% | 1% |
| 2 | 20% | 2% | 20% |
| 3 | 40% | 3% | 40% |

Table 603

| Expected Location (EL) | Detected Location (DL) | Relative Location (EL - DL) | Confidence Level |
|---|---|---|---|
| A1 | A1 | (0, 0, 0) - (0, 0, 0) → (0, 0, 0) | 100% |
| A1 | A2 | (0, 0, 0) - (0, 1, 0) → (0, 1, 0) | 99% |
| A1 | D2 | (0, 0, 0) - (1, 1, 0) → (1, 1, 0) | 98% |
| A1 | G1 | (0, 0, 0) - (2, 0, 0) → (2, 0, 0) | 80% |
| A1 | J2 | (0, 0, 0) - (3, 1, 0) → (3, 1, 0) | 59% |
| A1 | E2 | (0, 0, 0) - (1, 1, 1) → (1, 1, 1) | 97% |
| A1 | G2 | (0, 0, 0) - (2, 1, 0) → (2, 1, 0) | 79% |

Figure 6

RADIO-FREQUENCY IDENTIFICATION-BASED SHELF LEVEL INVENTORY COUNTING

BACKGROUND OF THE INVENTION

Companies commonly track assets by routinely performing inventory counts. This process often requires confirming that each recorded asset is correctly identified and stored in its correct location. In some scenarios, assets are stored in a room and the location recorded for the asset is a particular storage room. When storing assets at a room-level granularity, the inventory count process may be automated by tagging each asset with a radio-frequency identification (RFID) tag and confirming the asset is located in the correct room with an RFID reader. However, some companies may desire to track inventory at a shelf-level granularity. For example, for smaller components, inventory is stored on a rack that has multiple shelves, each shelf corresponding to a different shelf level. Moreover, storage racks may be deep and thus each storage location on the rack often has both a depth and shelf associated with it. Inventory counts are performed by confirming each asset is located on the correct rack, at the correct depth, and on the correct shelf-level. Shelf-level granularity requires identifying and confirming an XYZ location of an asset that corresponds to a rack, a rack shelf level, and a rack depth. Since traditional RFID solutions can only reliably identify whether an asset is inside a room, shelf-level inventory counts are typically performed manually and can take hours to complete. Therefore, a need exists to automate the tracking and inventory workflow of assets at a shelf-level granularity.

BRIEF DESCRIPTION OF THE DRAWINGS

Various embodiments of the invention are disclosed in the following detailed description and the accompanying drawings.

FIG. 5 is a set of tables illustrating an exemplary conversion of storage locations to XYZ locations.

FIG. 6 is a set of tables illustrating an exemplary determination of relative locations and confidence levels.

DETAILED DESCRIPTION

Figure 1:
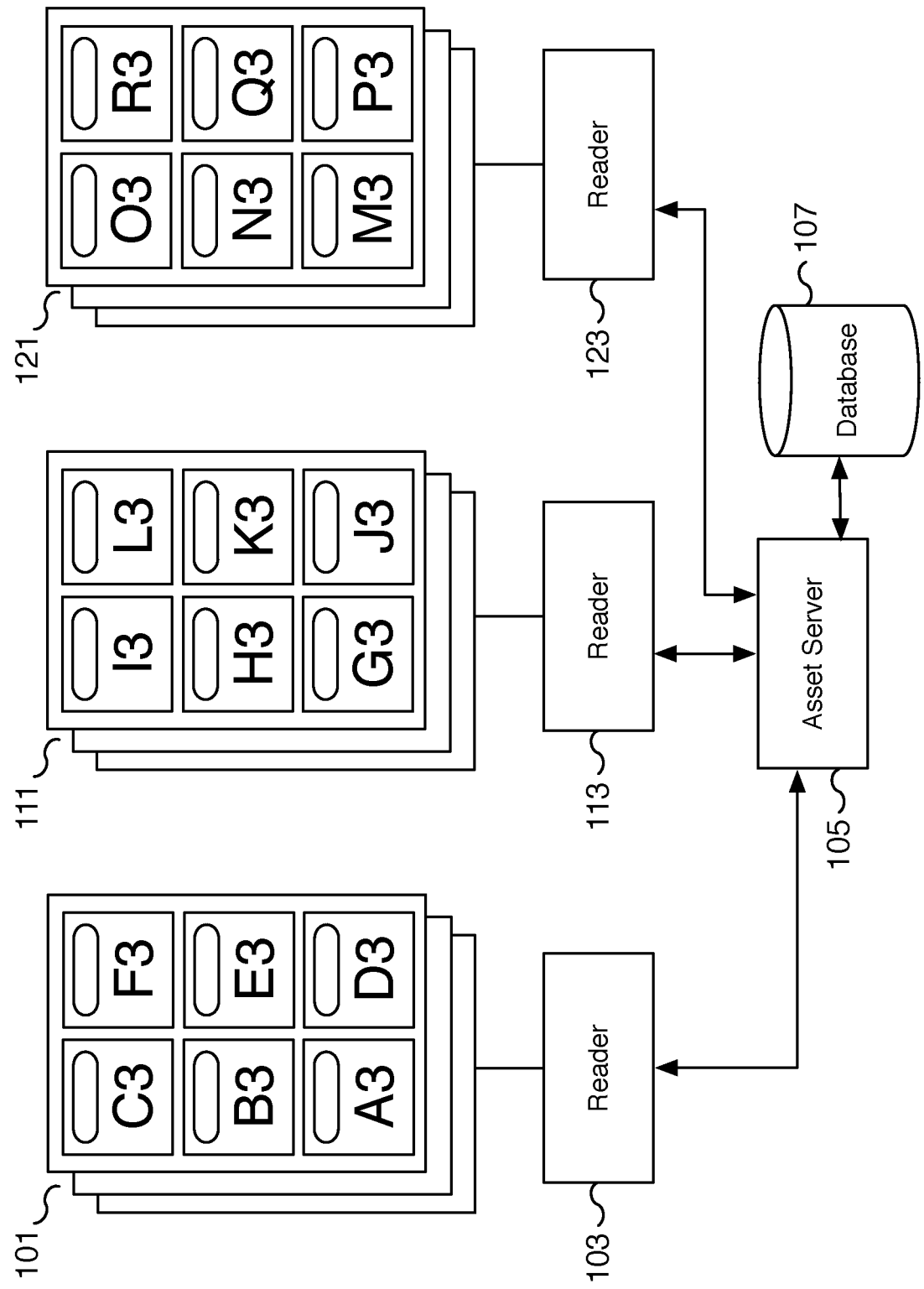
FIG. 1 is a block diagram illustrating an example of a system for performing radio-frequency identification (RFID)-based shelf-level inventory counting.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Radio-frequency identification (RFID)-based shelf-level inventory counting is disclosed. For example, the inventory tracking of assets stored at a shelf-level granularity is automated using RFID tags, the strategic placement of RFID antennas along storage racks, and a process for reading and analyzing the RFID tags to determine XYZ positions and associated confidence levels of the positions for each asset. In a storage location, tens to thousands of racks may be used to store inventory assets. Each asset is assigned a storage location that includes a particular rack, a rack shelf level, and a rack depth. For example, a rack ten spaces deep with three shelves has thirty storage locations. In a storage room with twenty racks, there are six hundred storage locations. Each storage location is uniquely identifiable with an XYZ location that corresponds to a rack, rack shelf level, and rack depth. In some embodiments, RFID antennas are placed on each shelf of each rack. In some embodiments, RFID antennas are placed on each shelf of each rack and at each shelf depth of each rack. In the various embodiments, the antennas are attached to RFID readers. For example, in some embodiments, thirty-two different antennas may feed into a single reader. In various embodiments, multiple readers are utilized to support additional antennas. Each reader is connected to an asset server for determining asset locations. By powering up the RFID antennas, the RFID antennas and readers detect RFID tags that are within range. Each detected tag and corresponding asset is assigned a detection location based on the location of the detected antenna. The detection location is compared to the expected location of the RFID tag by determining a relative location. Based on the determined relative locations, a confidence level is determined for each detected location. The determined confidence levels are then analyzed to select one of the detected locations as the location of an asset, which is compared to the expected location of the asset. An action based on the selected location is performed, for example, creating an inventory asset report and/or an actionable request to confirm the location of the asset.

In some embodiments, a radio frequency identification (RFID) tag is detected at a plurality of locations. For example, one or more RFID antennas detect an RFID tag attached to an asset placed in a storage rack. In some embodiments, the detection of RFID tags is performed over multiple detection read cycles and the results are aggregated to detect a plurality of locations. An expected location of the RFID tag is determined. For example, the expected location of an asset is stored in a database and retrieved. In some embodiments, the expected location corresponds to an XYZ position (e.g., a rack, rack shelf, and rack depth) of the asset and is retrieved from an asset server from a database. A confidence level for each of the detection locations that detected the RFID tag is determined. The confidence level is determined based on a relative location of the corresponding detection location as compared to the expected location. For example, each axis of the expected location is compared to each axis of a detected location. In some embodiments, each degree of separation corresponds to a reduction in the confidence level associated with the location. As one example, a detected location two racks over has a lower confidence level than a detected location on the same rack as the expected location. As another example, a detected location two spaces deeper on a rack has a lower confidence level than a detected location on the same rack but only one space deeper than the expected location. The determined confidence levels of the detection locations are analyzed to select at least one of the detection locations. For example, a detection location with the highest confidence level may be selected. An action based on the at least one selected detection location is performed. For example, an inspection report is generated to confirm that the location of an asset detected is different from the expected location. As another example, an inventory status report is generated that reports the number of assets in the room, the number of assets with accurate location matches, and the number of assets with mismatched locations. In some embodiments, a status report category matches each detected asset into different groups based on confidence levels.

FIG. 1 is a block diagram illustrating an example of a system for performing radio-frequency identification (RFID)-based shelf-level inventory counting. In the example shown, rack pairs 101, 111, and 121 are each a pair of racks arranged back to back and are used for storing inventory assets. Rack pair 101 includes one rack with locations A3, B3, and C3 and a second rack with locations D3, E3, and F3. Rack pair 111 includes one rack with locations G3, H3, and I3 and a second rack with locations J3, K3, and L3. Rack pair 121 includes one rack with locations M3, N3, and O3 and a second rack with locations P3, Q3, and R3. In the example shown, the back of the first rack of each rack pair is configured to face the back of the second rack of the rack pair such that the front of both racks of the rack pair are accessible. Each rack of rack pair 101, 111, and 121 includes three shelves and three depth positions. The shelves are denoted with a number (e.g., 1, 2 or 3), with the third shelf being the highest and the one visible in the diagram. The first shelf corresponds to the lowest shelf level. The second shelf corresponds to a middle level shelf above the first shelf and below the third shelf. As depicted in FIG. 1, the first and second shelf storage locations are located below the third shelf of each rack and thus partially obscured and not labeled in FIG. 1.

In the example shown, the rack depth locations are denoted with a letter (e.g., A, B, C, . . . P, Q, R). For example, in FIG. 1, rack depth A is closest to the front of the storage room and rack depth C is closest to the back of the storage room. In various embodiments, the letter rack depth can be converted to a numeric depth starting with a rack depth of zero and increasing as the location increases in depth along the rack and towards the back of the room. In some embodiments, storage locations for assets are identified by using a letter and number pair. For example, storage location A3 of rack pair 101 references the first rack of rack pair 101 at a shelf depth of zero (identified by the A of A3) and a shelf level of three (identified by the 3 of A3). As another example, storage location Q2 (not shown in FIG. 1) is a storage location of rack pair 121 and is located beneath storage location Q3 of rack pair 121. Storage location Q2 of rack pair 121 references the second rack of rack pair 121 at a shelf depth of one (identified by the Q of Q2) and a shelf level of two (identified by the 2 of Q2). In various embodiments, the rack configuration may be arranged differently but the same principles and appropriate location-naming scheme applies. For example, in some embodiments, the racks are configured as a single rack and not as rack pairs.

In the example shown, radio-frequency identification (RFID) readers 103, 113 and 123 are connected to rack pairs 101, 111, and 121 respectively. The readers 103, 113, and 123 can power RFID antennas affixed to the rack pairs 101, 111, and 121 and are used to detect RFID tags associated with assets stored at storage locations associated with the rack pairs. In some embodiments, RFID antennas are affixed at each shelf level of the rack. For example, a rack with three shelf levels has one antenna on each shelf In some embodiments, antennas are affixed at each level of the rack and at each rack depth. For example, a rack with a depth of three and three shelf levels has nine antennas. In some embodiments, multiple antennas are affixed to the top shelf. For example, the top shelf may be configured to have an antenna facing up and another antenna facing down. In FIG. 1, the ovals associated with the storage locations that are denoted by letter and number pair (e.g., A3, E3, N3, etc.) represent antennas attached to the rack at the corresponding storage location.

In the example shown, asset server 105 is a server utilized to process workflow associated with assets. For example, asset server 105 may be used to initiate an inventory count, to generate an inventory report, to record and update asset locations, and to test the functionality of the attached radio-frequency identification (RFID) equipment including RFID readers and antennas. Asset server 105 is attached to RFID readers 103, 113, and 123. Asset server 105 may initiate the powering of readers 103, 113, and 123 and process signal results received from the readers. Asset server 105 is communicatively connected to database 107. In various embodiments, database 107 is a data store for storing inventory and asset related information, such as the expected location of each inventory asset. In some embodiments, database 107 stores conversion tables for calculating confidence levels associated with detected locations of assets. In some embodiments, database 107 stores conversion tables for converting detected locations to an XYZ location. In various embodiments, each RFID reader is attached to one or more RFID antennas, and an asset server may be attached to one or more RFID readers.

Figure 2:
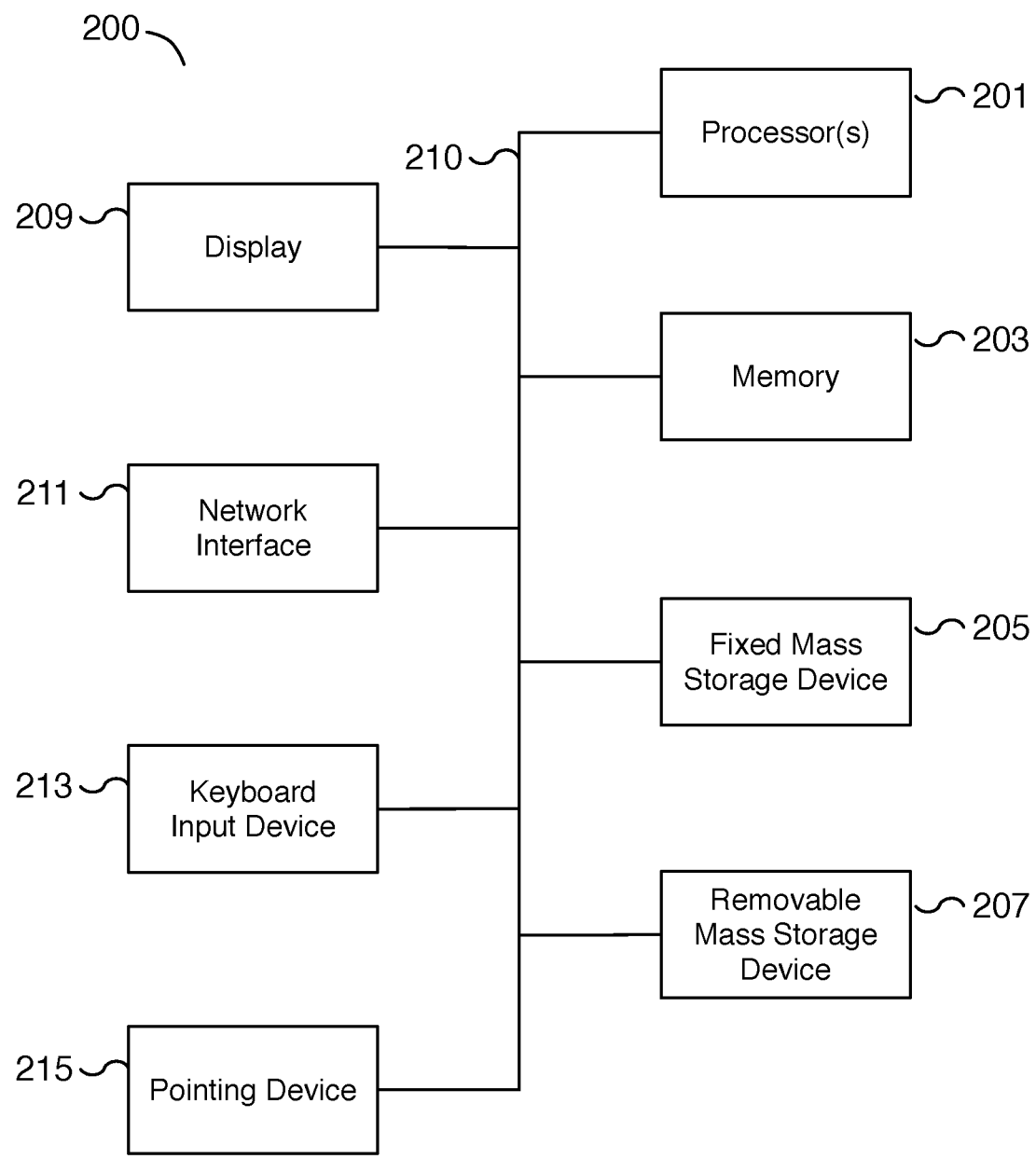
FIG. 2 is a functional diagram illustrating a programmed computer system for performing radio-frequency identification (RFID)-based shelf-level inventory counting.

FIG. 2 is a functional diagram illustrating a programmed computer system for performing radio-frequency identification (RFID)-based shelf-level inventory counting. As will be apparent, other computer system architectures and configurations can be used to perform RFID-based shelf-level inventory counting. In some embodiments, computer system 200 is a virtualized computer system providing the functionality of a physical computer system. Computer system 200, which includes various subsystems as described below, includes at least one microprocessor subsystem (also referred to as a processor or a central processing unit (CPU)) 201. For example, processor 201 can be implemented by a single-chip processor or by multiple processors. In some embodiments, processor 201 is a general purpose digital processor that controls the operation of the computer system 200. Using instructions retrieved from memory 203, the processor 201 controls the reception and manipulation of input data, and the output and display of data on output devices (e.g., display 209). In some embodiments, processor 201 includes and/or is used to provide functionality for performing RFID-based shelf-level inventory counting including detecting an RFID tag at a plurality of detection locations, determining an expected location of the RFID tag, determining a confidence level for each of the detection locations that detected the RFID tag based on a relative location of the corresponding detection location as compared to the expected location, analyzing the determined confidence levels of the detection locations to select at least one of the detection locations, and performing an action based on the at least one selected detection location. In some embodiments, computer system 200 is used to provide asset server 105 of FIG. 1. In some embodiments, processor 201 performs the processes described below with respect to FIGS. 7-10.

Processor 201 is coupled bi-directionally with memory 203, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 201. Also as is well known in the art, primary storage typically includes basic operating instructions, program code, data, and objects used by the processor 201 to perform its functions (e.g., programmed instructions). For example, memory 203 can include any suitable computer-readable storage media, described below, depending on whether, for example, data access needs to be bi-directional or uni-directional. For example, processor 201 can also directly and very rapidly retrieve and store frequently needed data in a cache memory (not shown).

A removable mass storage device 207 provides additional data storage capacity for the computer system 200, and is coupled either bi-directionally (read/write) or uni-directionally (read only) to processor 201. For example, storage 207 can also include computer-readable media such as flash memory, portable mass storage devices, magnetic tape, PC-CARDS, holographic storage devices, and other storage devices. A fixed mass storage 205 can also, for example, provide additional data storage capacity. Common examples of mass storage 205 include flash memory, a hard disk drive, and an SSD drive. Mass storages 205, 207 generally store additional programming instructions, data, and the like that typically are not in active use by the processor 201. Mass storages 205, 207 may also be used to store user-generated content and digital media for use by computer system 200. It will be appreciated that the information retained within mass storages 205 and 207 can be incorporated, if needed, in standard fashion as part of memory 203 (e.g., RAM) as virtual memory.

In addition to providing processor 201 access to storage subsystems, bus 210 can also be used to provide access to other subsystems and devices. As shown, these can include a display 209, a network interface 211, a keyboard input device 213, and pointing device 215, as well as an auxiliary input/output device interface, a sound card, speakers, additional pointing devices, and other subsystems as needed. For example, the pointing device 215 can be a mouse, stylus, track ball, or tablet, and is useful for interacting with a graphical user interface.

The network interface 211 allows processor 201 to be coupled to another computer, computer network, or telecommunications network using one or more network connections as shown. For example, through the network interface 211, the processor 201 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 201 can be used to connect the computer system 200 to an external network and transfer data according to standard protocols. For example, various process embodiments disclosed herein can be executed on processor 201, or can be performed across a network such as the Internet, intranet networks, or local area networks, in conjunction with a remote processor that shares a portion of the processing. Additional mass storage devices (not shown) can also be connected to processor 201 through network interface 211.

An auxiliary I/O device interface (not shown) can be used in conjunction with computer system 200. The auxiliary I/O device interface can include general and customized interfaces that allow the processor 201 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above and magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In addition, bus 210 is illustrative of any interconnection scheme serving to link the subsystems. Other computer architectures having different configurations of subsystems can also be utilized.

Figure 3:
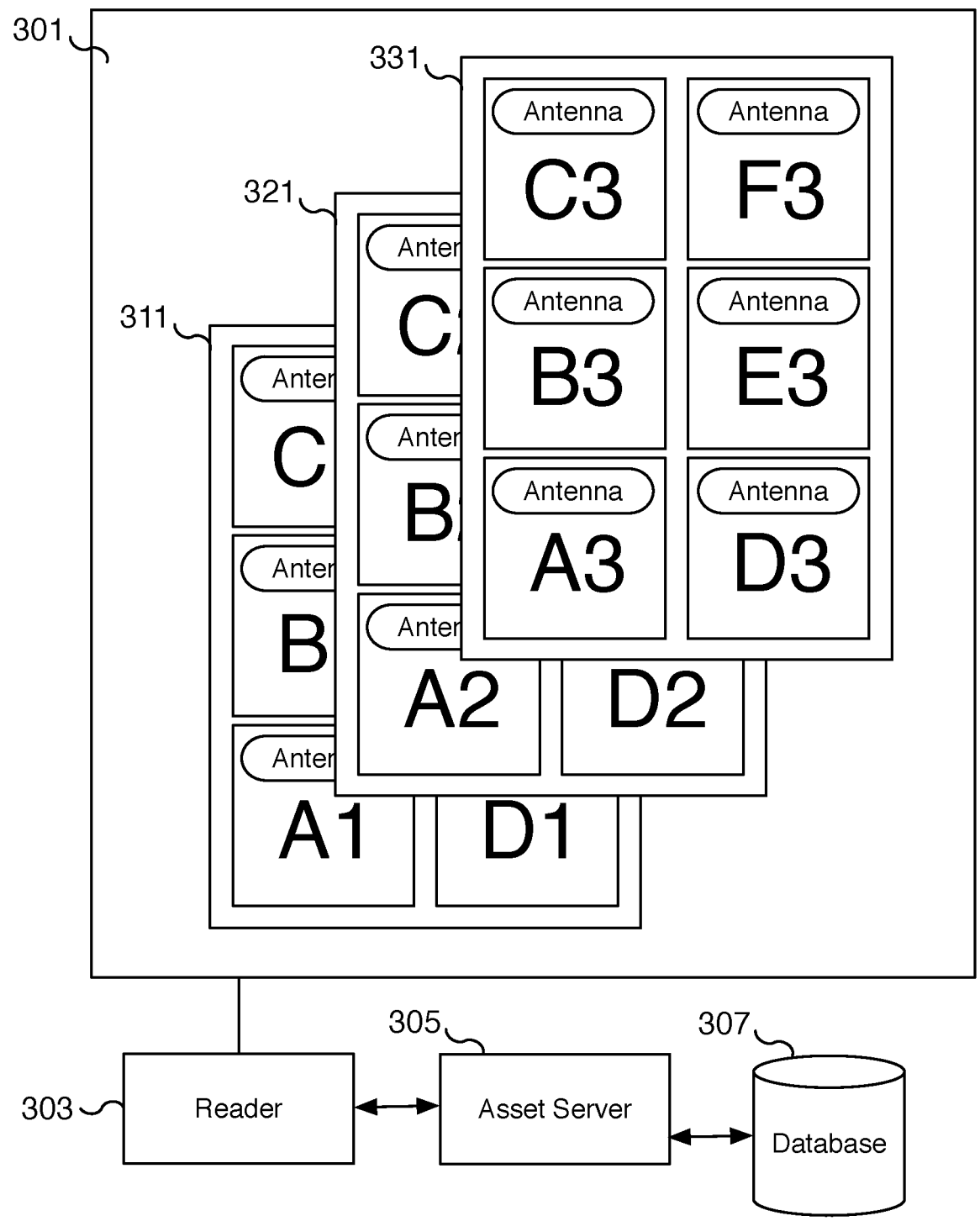
FIG. 3 is a block diagram illustrating an example of a system for performing radio-frequency identification (RFID)-based shelf-level inventory counting.

FIG. 3 is a block diagram illustrating an example of a system for performing radio-frequency identification (RFID)-based shelf-level inventory counting. The diagram of FIG. 3 corresponds to a single rack pair and is an example of one of multiple rack pairs, such as rack pair 101 of FIG. 1, which may make up a set of rack pairs in a storage room for storing inventory assets. The diagram of FIG. 3 depicts the different shelf levels of a storage rack pair, the corresponding storage locations in the rack pair at different rack depths and rack shelf levels, and antennas affixed at storage locations.

In the example shown, rack pair 301 is a pair of racks similar to rack pair 101 of FIG. 1. Storage locations A1, A2, A3, B1, B2, B3, C1, C2, and C3 correspond to a first rack of rack pair 301. Storage locations D1, D2, D3, E1, E2, E3, F1, F2, and F3 correspond to a second rack of rack pair 301. The racks in rack pair 301 are configured back to back such that each rack of the pair can be accessed from the front. The racks of rack pair 301 each have three shelf levels. Shelf level 311 of rack pair 301 corresponds to the lowest shelf level and is identified as the shelf level 1. Shelf level 321 of rack pair 301 corresponds to the second shelf level and is identified as the shelf level 2. Shelf level 331 of rack pair 301 corresponds to the top shelf level and is identified as the shelf level 3. As described above with respect to FIG. 1, storage locations are identified using a letter and number pair (e.g., A1, B1, E3, etc.) that uniquely identifies a rack, rack shelf level, and rack depth.

In some embodiments, radio-frequency identification (RFID) antennas are affixed at each storage location. In the example shown, the RFID antennas are represented as ovals and are each labeled in FIG. 3 as "antenna" with one affixed to each storage location. In some embodiments, multiple antennas are affixed to the top shelf. For example, the top shelf may be configured to have an antenna facing up and another antenna facing down. Although individual connections are not shown in FIG. 3, each antenna affixed to rack pair 301 is connected to RFID reader 303. In the example shown, reader 303 is connected to asset server 305 and asset server 305 is communicatively connected to database 307. In various embodiments, reader 303, asset server 305, and database 307 are, respectively, reader 103, asset server 105, and database 107 of FIG. 1.

Figure 4:
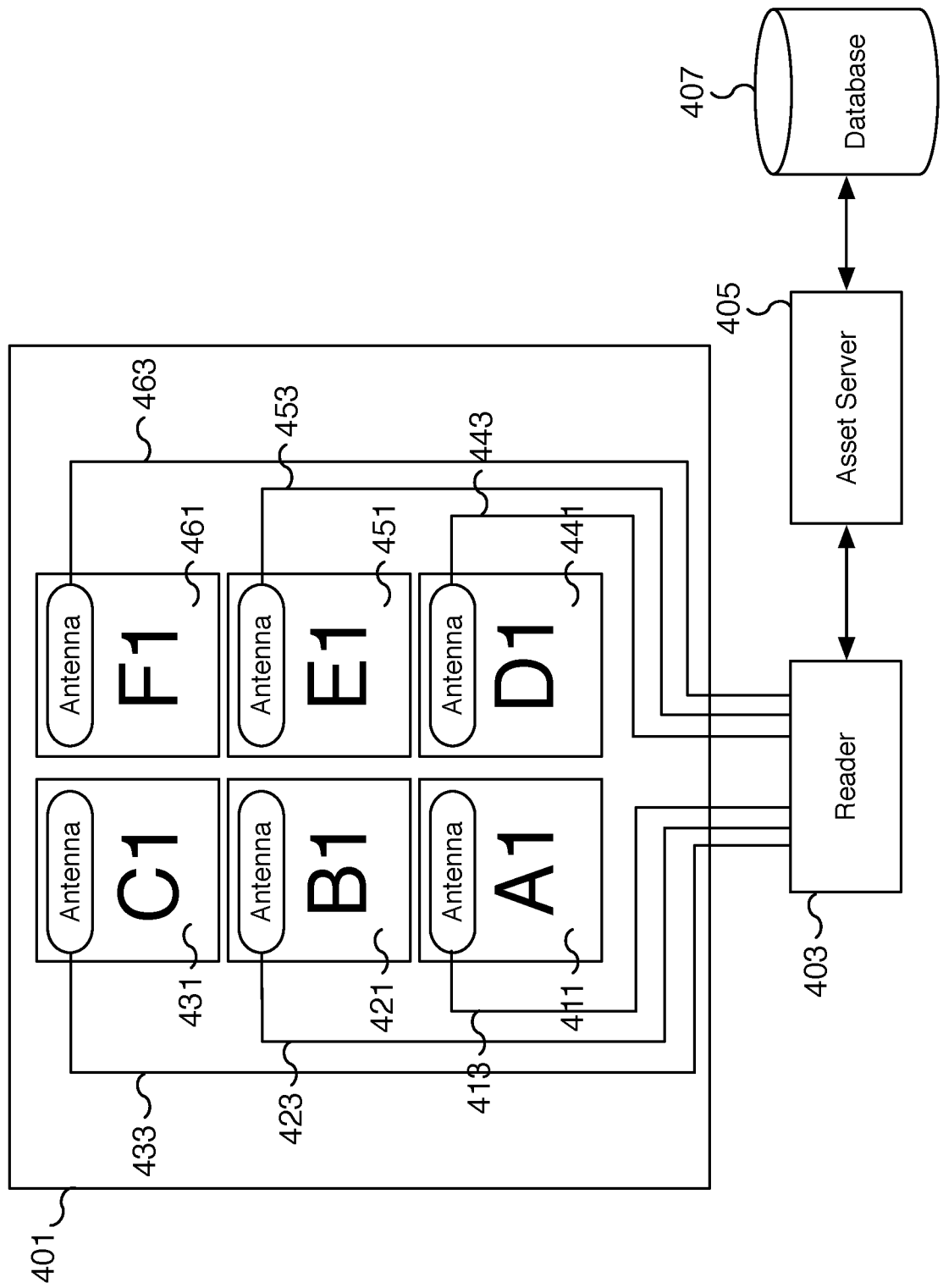
FIG. 4 is a block diagram illustrating an example of a system for performing radio-frequency identification (RFID)-based shelf-level inventory counting.

FIG. 4 is a block diagram illustrating an example of a system for performing radio-frequency identification (RFID)-based shelf-level inventory counting. The diagram of FIG. 4 corresponds to the exemplary configuration of a single shelf level for a rack pair. In some embodiments, shelf levels of rack pairs 101, 111, and 121 of FIG. 1 are configured according to FIG. 4. Similarly, in some embodiments, shelf levels 311, 321, and 331 of FIG. 3 may be configured according to FIG. 4. As shown with respect to FIGS. 1 and 3, a rack pair has multiple shelf levels and each rack of the rack pair has multiple shelves.

In the example shown, shelf level 401 is a single shelf level shared across two racks. For example, a rack pair of two racks, configured back-to-back, has shelves that share the same height. Shelf level 401 includes shelves corresponding to a first rack with storage locations 411 (labeled as A1), 421 (labeled as B1), and 431 (labeled as C1) and a second rack with storage locations 441 (labeled as D1), 451 (labeled as E1), and 461 (labeled as F1). Each storage location 411, 421, 431, 441, 451, and 461 uniquely identifies a rack, rack shelf level, and rack depth. In various embodiments, attached at each storage location is a radio-frequency identification (RFID) antenna. RFID antennas 413, 423, 433, 443, 453, and 463 are each affixed at storage locations 411, 421, 431, 441, 451, and 461 respectively. In various embodiments, the location of each storage location 411, 421, 431, 441, 451, and 461 is associated with the respective location of each RFID antenna 413, 423, 433, 443, 453, and 463. For example, storage location 411 (at A1) is associated with the location of antenna 413. As another example, storage location 451 (at E1) is associated with the location of antenna 453. As described further with respect to FIGS. 7-10, in some embodiments, an RFID tag detected by an antenna and its corresponding asset is assigned the location of the antenna. For example, an asset detected by antenna 423 is associated with the storage location 421 (B1) regardless of the signal strength received by antenna 423. As another example, an asset detected by antenna 463 is associated with the storage location 461 (F1) regardless of the signal strength received by antenna 463. As yet another example, the same asset may be detected by antenna 453 and a second detected location 451 (E1) is associated with the asset.

In the example shown, each radio-frequency identification (RFID) antenna 413, 423, 433, 443, 453, and 463 is attached to RFID reader 403. In some embodiments, each antenna has an individual connection to a reader. Reader 403 is connected to asset server 405 and asset server 405 is communicatively connected to database 407. In various embodiments, reader 403, asset server 405, and database 407 are, respectively, reader 103, asset server 105, and database 107 of FIG. 1. In various embodiments, reader 403, asset server 405, and database 407 are, respectively, reader 303, asset server 305, and database 307 of FIG. 3.

FIG. 5 is a set of tables illustrating an exemplary conversion of storage locations to XYZ locations. Tables 501, 502, and 503 each illustrate conversions from a rack, rack shelf, and rack depth storage location, denoted by a letter and number pair (e.g., A1, B3, K1, O2, etc.) to an XYZ location (e.g., (0, 0, 0), (0, 2, 1), (3, 0, 1), (4, 1, 2), etc.). In various embodiments, the letter and number pair storage location denotes a rack shelf position, that is, a position on a shelf in a rack and at a particular depth in the rack. An XYZ location identifies a location in three-dimensional space and has corresponding X-axis, Y-axis, and Z-axis values. In some embodiments, the XYZ positions utilize an origin at (0, 0, 0), which corresponds to the rack at the front, left corner of the room and the corresponding rack storage location on that rack with a rack shelf level of zero and a rack depth of zero. Starting at the origin, as the storage position shifts to different racks, the X value increases. As the storage position rises to higher-level shelves, the Y value increases. And as the storage position shifts deeper in the racks (e.g., deeper into the room from the origin), the Z value increases. For example, two storage locations on the same rack with the same rack depth but separated by only a difference of one shelf will have identical X and Z values but will differ in Y values by one.

In the example shown, the room configuration illustrated by tables 501, 502, and 503 corresponds to a room with six racks with fifty-four unique storage locations. Each rack has a depth of three spaces and each rack has three shelves, starting with 1 as the lowest shelf and 3 as the highest. For example, the first rack includes storage locations A1, A2, A3, B1, B2, B3, C1, C2, and C3. As another example, the second rack includes storage locations D1, D2, D3, E1, E2, E 3, F1, F2, and F3. In various embodiments, pairs of racks are placed back-to-back. For example, the back of the first shelf (i.e., the shelf with storage location A1) faces the back of the second shelf (i.e., the shelf with storage location D1). As yet another example, the last rack in the storage room, the sixth rack, includes storage locations P1, P2, P3, Q1, Q2, Q3, R1, R2, and R3. In the example shown, the letters associated with the storage location uniquely identify the rack. Applying tables 501, 502, and 503, a storage location can be converted to an XYZ location. For example, table 501 includes the storage position A1 and the corresponding XYZ location (0, 0, 0). The storage position A1 corresponds to the first rack (X has value 0), bottom rack shelf (Y has value 0), and zero depth (Z has value 0). As another example, storage position J2 has the corresponding XYZ location (3, 1, 0) and storage position G2 has the corresponding XYZ location (2, 1, 0).

In various embodiments, the expected location and a detected location of a radio-frequency identification (RFID) tag and associated asset both utilize the XYZ positions as illustrated in the tables of FIG. 5. At the time an asset is recorded, e.g., by an asset server, the expected location utilizes the letter and number pair shelf storage locations and/or the XYZ locations of tables 501, 502, and 503. In various embodiments, the detected locations of RFID tags assigned to assets also utilize the shelf storage locations and/or the XYZ locations corresponding to tables 501, 502, and 503. As described further in the figures below, both the expected and detected locations share the same coordinate system in order to determine a relative location when comparing the two.

FIG. 6 is a set of tables illustrating an exemplary determination of relative locations and confidence levels. The tables of FIG. 6 are utilized in determining a confidence level of a detected location of a radio-frequency identification (RFID) tag as compared to an expected location of the asset associated with the RFID tag. In the example shown, table 601 is utilized to determine the reduction in confidence level of a detected location based on the degree of separation of the detected location from the expected location. In the example shown, table 603 illustrates example determinations of confidence levels corresponding to assets based on an expected location, a detected location, and a calculated relative location.

In the example shown, table 601 is a table mapping the degrees of separation to a percentage of reduction in confidence level. Table 601 illustrates the drop in confidence may vary depending on which axis (i.e., the X-axis, Y-axis, and/or Z-axis) the separation applies to. For example, table 601 indicates a difference of two degrees of separation in the X-axis corresponds to a 20% reduction in confidence level compared to a 2% reduction in confidence level for the same separation along the Y-axis. In various embodiments, the reduction in confidence level is least significant when the degree of separation is detected between shelf levels (i.e., along the Y-axis). For example, a radio-frequency identification (RFID) tag is often detected by the RFID antenna affixed to the shelf above the tag on the same rack and rack depth. A 1% drop in confidence results in a high level of confidence that the asset is in the expected location even though the reading corresponds to a detected location on a higher shelf. In various embodiments, the reduction in confidence level as the degrees in separation increase is non-linear. For example, for the X-axis and Z-axis, as the degree of separation increases from 1 to 2 to 3 degrees of separation, the reduction in the confidence level increases from 1% to 20% to 40%. In some embodiments, table 601 is extended beyond three degrees of separation. In some embodiments, once the degrees of separation exceed a threshold, the reduction in confidence is set to a maximum amount. For example, in the response to a degree of separation larger than three degrees in the X-axis, the reduction in confidence may be pinned to 60%. In some embodiments, the maximum threshold degree of separation is based on the maximum distance an RFID reader can accurately detect an RFID tag.

In various embodiments, the values for the reduction in confidence level may be adjusted based on the room, the layout of storage racks, the layout of the shelves, and the division of shelf depth that corresponds to a storage space in a rack, among other properties. In some embodiments, pairs of racks are separated by a narrower or wider aisle. The reduction in confidence level may be adjusted for the existence of an aisle between racks and/or the width of the aisle between racks. In some embodiments, the rack aisles are accounted for by assigning an XYZ location to the aisle. For example, an aisle may be assigned an X-value and that X-value is not utilized by any storage locations.

In various embodiments, the metrics utilized for the reduction in confidence levels in table 601 are determined by performing configuration testing on the storage environment to determine optimal values for accurately predicting asset location. For example, the locations of intentionally misplaced assets are measured to determine an accurate drop in confidence level. Assets may be placed across aisles, along walls, etc. to determine the impact of aisles, walls, and other factors on the detection location. In some embodiments, different reductions in confidence level metrics may be utilized for locations associated with racks close to walls as compared to locations for racks between other racks (e.g., in the middle of the room). In various embodiments, the type of racks, the material the racks are constructed from (e.g., metal, plastic, etc.), the type of materials the assets are constructed from, how the various objects in the room interact with radio-frequency waves (e.g., columns, support beams, etc.), whether the assets are stored in bins at the storage location, and the configuration of the location and orientation of the antennas attached to the racks, among other factors, may influence the detection locations and are accounted for by performing configuration testing of the storage environment.

In the example shown, table 603 is a table illustrating example determinations of confidence levels for assets based on detected locations. Each row of table 603 corresponds to a detection location and the corresponding confidence level in the detected location. Depicted in column 1 of table 603, each asset has a recorded expected location (EL). In various embodiments, the expected location is recorded when the asset is placed in storage and/or its location updated during inventory counts. In the example shown, each row of table 603 corresponds to a detected location of an asset with the expected location A1. In the example, each row may correspond to the same asset or different assets all stored at the same storage location (i.e., A1). In various embodiments, one or more assets may be stored at a storage location. For example, multiple assets may be stored in a bin at the storage location. In some embodiments, one or more radio-frequency identification (RFID) tags are applied to the bin the asset is stored inside and not to the actual asset. For example, for an asset stored in a bin, an asset tag with an inventory identifier is applied to the asset, an RFID tag is applied to the bin, and the asset tag is associated with the RFID tag.

Depicted in column 2 of table 603, each asset has a detected location (DL). In various embodiments, the detected location is the location corresponding to the radio-frequency identification (RFID) antenna that detects the corresponding RFID tag of the asset. In various embodiments, the various storage locations (e.g., A1, A2, E3, R3, etc.) are assigned to the corresponding RFID antennas when the room is configured. As described above, in various embodiments, antennas may be installed at each shelf for each rack. In some embodiments, one or more antennas may be installed along the depth of the rack.

Depicted in column 3 of table 603, each asset has a determined relative location (EL−DL). The relative location is calculated by finding the degree of separation for each axis between the expected location and detected location. In the example shown, the expected location and detected location are converted to XYZ locations. In some embodiments, the conversion is determined by utilizing a storage location to XYZ location mapping as described with respect to tables 501, 502, and 503 of FIG. 5. Once the storage locations are in an XYZ location coordinate system, a relative location is determined. In the example shown, the relative location is determined by finding the degree of separation between the corresponding X-axis, Y-axis, and Z-axis. For example, the relative location between expected location A1 and detected location A1 s (0, 0, 0) and the degree of separation for each axis is also 0. As another example, the relative location between expected location A1 and detected location J2 is (3, 1, 0) and the degree of separation for the X-axis is 3, the Y-axis is 1, and the Z-axis is 0. As another example, the relative location between expected location A1 and detected location E2 is (1, 1, 1) and the degree of separation for the X-axis is 1, the Y-axis is 1, and the Z-axis is 1.

Depicted in column 4 of table 603, each asset has a determined Confidence Level that corresponds to the determined confidence level for the detected location as compared to the expected location. The confidence level is based on the determined reduction in confidence level corresponding to the relative location of column 3 of table 603. In the example shown, the reduction in confidence level utilizes table 601 to map degrees of separation to a reduction in confidence level. As explained above, using table 601, the reduction in confidence for each axis is determined by that axis' degree of separation. In various embodiments, by determining the degree of separation for each axis independently, the reduction in confidence level for each axis is calculated independent from one another. For example, a two degree of separation in the X-axis or Z-axis results in a 20% reduction in confidence level while a two degree of separation in the Y-axis results in a 2% reduction in confidence level. For a relative location (3, 1, 0), the reduction in confidence level is based on 3 degrees of separation along the X-axis (corresponding to a 40% reduction in confidence level), a 1 degree of separation along the Y-axis (corresponding to a 1% reduction in confidence level), and a 0 degree of separation in the Z-axis (corresponding to a 0% reduction in confidence level). As another example, for a relative location (1, 1, 0), the reduction in confidence level is based on a 1 degree of separation along the X-axis (corresponding to a 1% reduction in confidence level), a 1 degree of separation along the Y-axis (corresponding to a 1% reduction in confidence level), and a 0 degree of separation in the Z-axis (corresponding to a 0% reduction in confidence level).

In various embodiments, the confidence level as depicted in column 4 of table 603 is based on the cumulative reduction in confidence level starting with an initial 100% confidence level. As shown in the example, an expected location A1 and a detected location A1 has a 100% confidence level since the cumulative reduction in confidence level for each axis is 0%. As another example, an expected location A1 and a detected location J2 has a 59% confidence level since the cumulative reduction in confidence level is 41%, which corresponds to a 40% reduction along the X-axis and a 1% reduction along the Y axis. As yet another example, an expected location A1 and a detected location D2 has a 98% confidence level since the cumulative reduction in confidence level is 2%, which corresponds to a 1% reduction along the X-axis and a 1% reduction along the Y axis. As explained below, in various embodiments, the determined confidence level associated with a selected detected location may be utilized to determine whether the inventory asset is in its expected location and the level of confidence to place in that determination.

Figure 7:
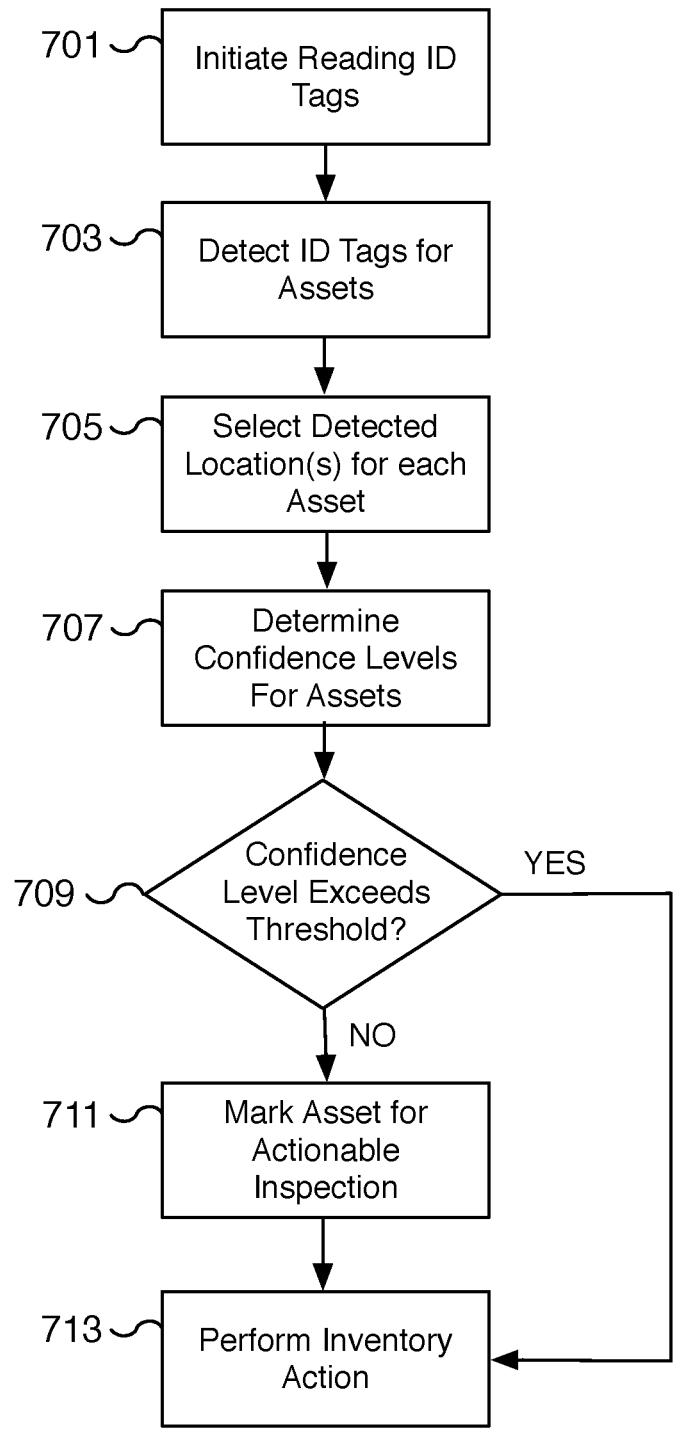
FIG. 7 is a flow diagram illustrating an embodiment of a process for performing radio-frequency identification (RFID)-based shelf-level inventory counting.

FIG. 7 is a flow diagram illustrating an embodiment of a process for performing radio-frequency identification (RFID)-based shelf-level inventory counting. The process of FIG. 7 may be utilized to determine whether inventory assets are located in their expected locations. In response to an asset having a high likelihood of being misplaced (i.e., not in the expected location), an inventory action may be performed to indicate that action should be taken to locate a potentially misplaced asset. In some embodiments, the action may include a list of potential locations to find the asset. In some embodiments, the process of FIG. 7 is performed by asset server 105 of FIG. 1 using RFID readers 103, 113, and 123 of FIG. 1 to detect RFID tags on assets stored in rack pairs 101, 111, and 121 of FIG. 1.

At 701, the reading of radio-frequency identification (RFID) tags is initiated. For example, the deployed RFID readers, such as readers 103, 113, and 123 of FIG. 1, supply power to the corresponding RFID antennas to power nearby RFID tags. By charging nearby RFID tags, the RFID tags are detectable by the RFID readers.

At 703, radio-frequency identification (RFID) tags are detected and associated with assets. For example, the RFID tags powered at 701 are detected by one or more RFID antennas and RFID readers. In some embodiments, one or more antennas will detect the same RFID tag. In various embodiments, the detected RFID tag and corresponding asset is associated with the location of the antenna. In some embodiments, once an antenna receives a signal from an RFID tag, the location associated with the tag does not depend on the signal strength of the received signal but only the location of the antenna.

Figure 9:
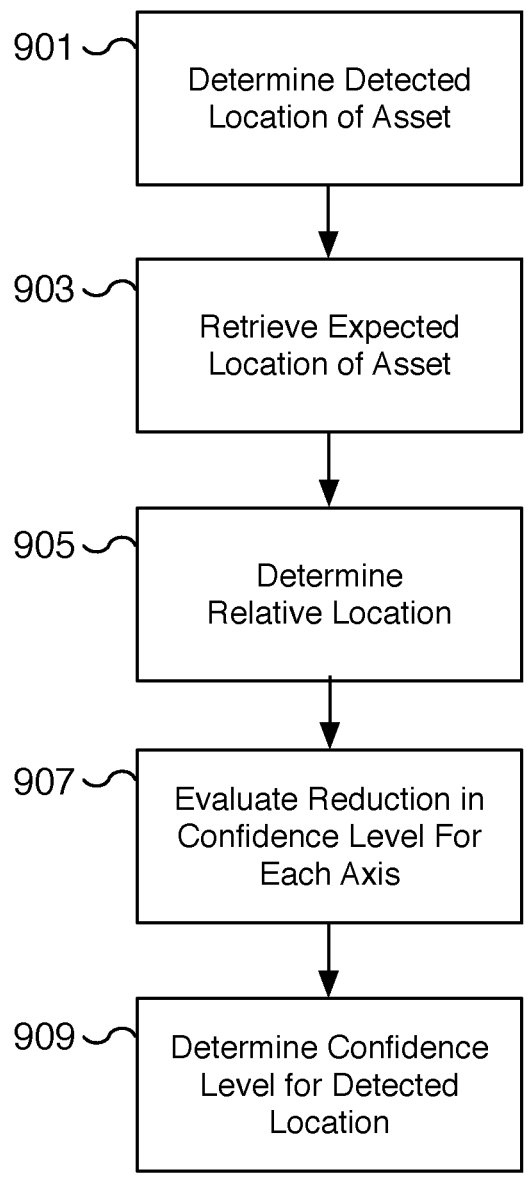
FIG. 9 is a flow diagram illustrating an embodiment of a process for determining a confidence level for a detected location of an asset.

At 705, one or more detected locations are selected for each asset. For example, one or more locations associated with the radio-frequency identification (RFID) tag detected at 703 are associated with an asset and selected as the detected locations. In some embodiments, the selected detected locations are based on the confidence levels of the associated RFID tag locations. In some embodiments, a selected detected location is based on the confidence level of the antenna detecting the associated RFID tag. In various embodiments, a single detected location is selected and is based on the location with the highest confidence level. For example, a confidence level is determined for each detected location and the location with the highest confidence level is selected as the selected detected location regardless of received signal strengths. In some embodiments, the confidence level is based on the degree of separation from the expected location of the asset. In some embodiments, the process of FIG. 9 is utilized to determine the confidence level for each detected location.

At 707, a confidence level for each asset is determined. For example, at 705 a detected location is selected and at 707 the confidence level is determined based on the selected detected location. In various embodiments, the confidence level is based on the relative location of the detected location compared to the expected location. A confidence level of 100% indicates complete confidence that the asset is in the correct and expected location. A low confidence indicates a high likelihood the asset has been misplaced and will not be found in its expected location.

At 709, the confidence level determined at 707 is compared to a threshold value. In response to a confidence level that exceeds the threshold value, processing continues to 713. In response to a confidence level that does not exceed the threshold value, processing continues to 711.

At 711, an asset is marked for actionable inspection. For example, in the event the threshold value is set to 90%, a confidence level of 90% or below for an asset results in processing continuing from 709 to 711 where the asset is marked for actionable inspection. An example of actionable inspection may include the requirement that a service operator physically inspects the asset and confirms its location. Assets with a confidence level below the threshold metric have likely been misplaced and the operator's task may be to locate the misplaced asset. Without an actionable inspection, a misplaced asset's location may not be identified. By utilizing a threshold metric, a service operator can receive an actionable report limited to a subset of inventory assets.

At 713, an inventory action is performed. For example, an inventory report may be generated as part of an inventory action. An inventory report may report statistics of the inventory assets including the number and types of location matches. For example, an inventory report may include the total number of assets identified in the room, the number of assets with accurate matches (e.g., a confidence level of 100%), the number of assets with a close proximity match (e.g., a confidence level between 95% and 100% or another similar range), and the number of assets with a room match (e.g., a confidence level of less than 80% or another similar range). An inventory report may also include the asset tag identifier, the reader that identified the radio-frequency identification (RFID) tag, the RFID antenna location, the confidence level of the detected location, and the expected location, among other information.

In some embodiments, the inventory action includes actionable inspection details for assets that do not exceed the confidence level threshold, such as the assets marked at 711. The actionable inspection may include the requirement that the marked asset be physically located and inspected. In some embodiments, the actionable inspection includes one or more potential locations to locate the asset in the event the asset is not in the expected location. The potential locations may be based on the detected locations and the locations of the antennas associated with the detected locations.

Figure 8:
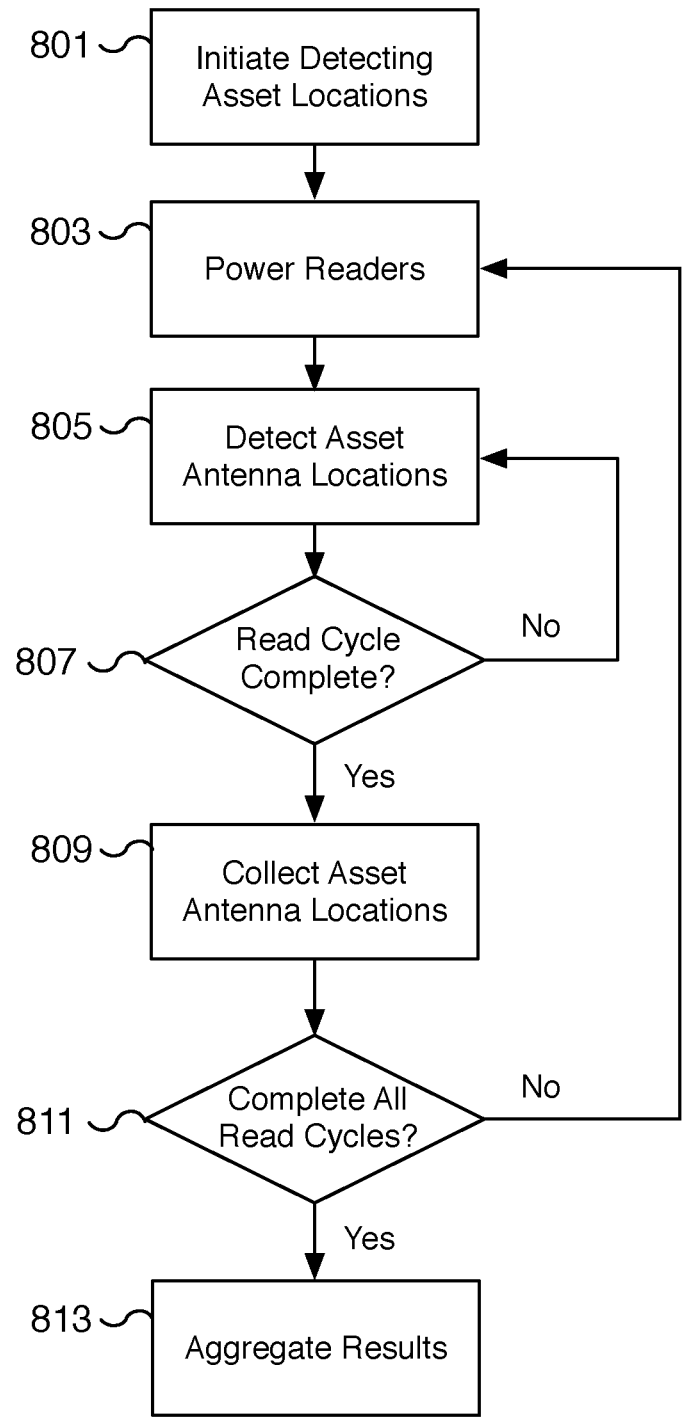
FIG. 8 is a flow diagram illustrating an embodiment of a process for performing radio-frequency identification (RFID)-based shelf-level inventory counting by aggregating read cycles.

FIG. 8 is a flow diagram illustrating an embodiment of a process for performing radio-frequency identification (RFID)-based shelf-level inventory counting by aggregating read cycles. For example, the process of FIG. 8 may be utilized to generate a more accurate accounting of assets in a room. In various embodiments, aggregating read cycles results in more accurate RFID tag detection and is necessary for shelf-level inventory counting. In some embodiments, the process of FIG. 8 is performed by asset server 105 of FIG. 1 using RFID readers 103, 113, and 123 of FIG. 1 to detect RFID tags on assets stored in rack pairs 101, 111, and 121 of FIG. 1. In some embodiments, the process of FIG. 8 is utilized at step 703 of FIG. 7 to detect RFID tags for assets and the aggregate results of FIG. 8 are utilized by step 705 of FIG. 7 to select one or more detected locations for each asset.

At 801, the detection of asset locations is initiated. For example, an asset server begins the process of detecting asset locations and aggregating the results. The process may include confirming that radio-frequency identification (RFID) readers are properly configured and can be accessed by the asset server, the asset server can access a data store that contains inventory information, that a current cycle count is not active, etc. In some embodiments, the initialization includes determining the total number of read cycles to perform and the amount of time to pause between each read cycle.

At 803, the radio-frequency identification (RFID) readers are powered and supply power to connected RFID antennas. The powering of the readers charges nearby RFID tags associated with the assets to be detected by the readers.

At 805, the radio-frequency identification (RFID) readers detect nearby RFID tags and associate each tag with the asset and an antenna location. For example, an RFID tag detected by a particular antenna is associated with the location of that antenna. In various embodiments, the signal from the RFID tag is utilized by an antenna to detect the RFID tag and the location associated with the tag is based on the pre-defined location of the antenna.

At 807, a determination is made whether the read cycle is complete. In response to completing the read cycle, processing continues to 809. In response to the read cycle being incomplete, processing continues back to 805 where the radio-frequency identification (RFID) readers continue to detect RFID tags and the associated antenna locations. In various embodiments, a read cycle may be configured to take from 2 to 2.5 minutes to complete. In some embodiments, the antennas will continue to be powered during the entire duration of the read cycle. In some embodiments, the duration of the read cycle is based on diminishing returns. For example, the length of the read cycle may be based on how long it takes before no new tags are identified. In some embodiments, the duration of the read cycle is based on the length of time between detecting new tags.

At 809, antenna locations for the assets detected are collected. For example, a read cycle of two minutes will typically result in reading most of the radio-frequency identification (RFID) tags in the room. At 809, the detected locations associated with the tags are collected by an asset server. In some scenarios, the same RFID tag may be detected by different antennas and multiple locations will be collected. In some embodiments, at 809, the RFID readers and antennas are paused and the antennas are no longer powered.

At 811, a determination is made on whether all read cycles have completed. In response to all read cycles completing, processing continues to 813. In response to additional read cycles needing to be performed, processing continues back to 803. In some embodiments, processing continues back to 803 after a pause. For example, between each read cycle, the radio-frequency identification (RFID) readers and antennas are paused and powered off. By cycling reading and pausing, the readers and antennas are not constantly active.

As an example of a run pattern, the aggregated read cycles may be configured to run for a total duration of one hour. During the one-hour aggregate read, twenty read cycles are performed. Each read cycle is configured to power on the radio-frequency identification (RFID) equipment for 2.5 minutes and pause the equipment for 30 seconds. In some embodiments, a one-hour aggregate read, includes at least fifteen read cycles and reading is paused between read cycles.

At 813, the results are aggregated. For example, the asset locations collected at 809 for each read cycle are aggregated. The aggregate results present an accurate inventory of the radio-frequency identification (RFID) tags in a storage room and can be utilized to perform shelf-level inventory counting. For example, during the aggregate run time, the multiple read cycles result in a larger collection of RFID tag locations than a single read cycle. By the end of the last read cycle, most if not all RFID tags in the room will be detected. In various embodiments, duplicative locations are not necessary and may be removed in the aggregate results.

FIG. 9 is a flow diagram illustrating an embodiment of a process for determining a confidence level for a detected location of an asset. For example, the process of FIG. 9 may be utilized to select a detected location corresponding to a radio-frequency identification (RFID) tag based on the location with the highest confidence level. In some embodiments, the process of FIG. 9 is performed by asset server 105 of FIG. 1 using expected locations of assets stored in database 107 of FIG. 1. In various embodiments, the detected locations of assets utilize RFID readers 103, 113, and 123 of FIG. 1 to detect RFID tags on assets stored in rack pairs 101, 111, and 121 of FIG. 1. In some embodiments, the process of FIG. 9 is utilized at steps 705 and 707 of FIG. 7 to help select detected locations based on confidence levels and to determine confidence levels for assets.

At 901, detected locations are determined for an asset. For example, a detected location is determined by reading a radio-frequency identification (RFID) tag using an RFID reader and associating the location of the antenna to the asset assigned to the tag. At 903, an expected location of the asset is retrieved. For example, an expected location is retrieved from a database, such as database 107 of FIG. 1 by an asset server, such as asset server 105 of FIG. 1. In various embodiments, the detected and expected locations correspond to a storage location on a rack with a shelf height and rack depth.

At 905, a relative location is determined. In various embodiments, the detected location and expected location are not in an XYZ location format and must first be converted into an XYZ location. For example, a storage location using a letter and number pair may be converted into an XYZ location to uniquely identify a rack with a shelf height and a rack depth. As an example scenario, tables 501, 502, and 503 may be utilized to convert a storage location into an XYZ location. The relative location is determined by finding the degree of separation between the expected location and detected location along each axis. For example, the relative location of a detected location of (0, 0, 0) from an expected location of (0, 0, 0) is (0, 0, 0) since each axis of the detected location is zero degrees of separation from the expected location. As another example, the relative location of a detected location of (2, 1, 1) from an expected location of (0, 0, 0) is (2, 1, 1) since the X-axis of the detected location is 2 degrees of separation from the X-axis of the expected location and the Y-axis and Z-axis are both 1 degree of separation from the respective Y-axis and Z-axis of the expected location. As yet another example, the relative location of a detected location of (2, 1, 1) from an expected location of (3, 2, 0) is (1, 1, 1) since the X-axis, Y-axis, and Z-axis are each 1 degree of separation from the respective X-axis, Y-axis, and Z-axis of the expected location. In various embodiments, the degree of separation between the expected location and the detected location is determined independently for each axis. As described above with respect to FIG. 6, table 603 further illustrates example determinations of relative locations by converting an expected and detected location to an XYZ location.

At 907, the reduction in confidence level for each axis is evaluated. Using the relative location determined at 905, a reduction in confidence level is evaluated for the X-axis, Y-axis, and Z-axis. By evaluating the reduction for each axis independent of other axes, the rate of reduction may be configured differently for each axis. As described with respect to FIG. 6, table 601 illustrates example mappings of degrees of separation to reductions in confidence levels where the rate the confidence level reduces increases much slower for the Y-axis than the X-axis and Z-axis. In various embodiments, using the relative location determined at 905, the reduction in confidence level is determined for each axis using a mapping from degree of separation to reduction in confidence level such as the mapping described in table 601 of FIG. 6. For example, using the conversions set forth in table 601, a relative location of (0, 1, 0) has a reduction in confidence for the Y-axis of 1% and 0% for the X-axis and Z-axis. As another example, using the conversions set forth in table 601, a relative location of (3, 1, 0) has a reduction in confidence of 40% for the X-axis, 1% for the Y-axis, and 0% for the Z-axis.

At 909, the confidence level for the detected location is determined. In various embodiments, the confidence level is determined by subtracting the cumulative reduction in confidence level of all axes from an initial confidence level of 100%. For example, using the conversions set forth in table 601, a relative location of (0, 1, 0) has a reduction in confidence for the Y-axis of 1% and 0% for the X-axis and Z-axis and thus a cumulative reduction in confidence level of all axes of 1% resulting in a 99% confidence level. As another example, using the conversions set forth in table 601, a relative location of (3, 1, 0) has a cumulative reduction in confidence level of 41% resulting in a 59% confidence level. As another example, using the conversions set forth in table 601, a relative location of (2, 1, 0) has a cumulative reduction in confidence level of 21% resulting in a 79% confidence level. As described above with respect to FIG. 6, table 603 further illustrates example determinations of confidence levels for detected locations based on determining a relative location of the detected location compared to the expected location and the associated reduction in confidence for each degree of separation.

Figure 10:
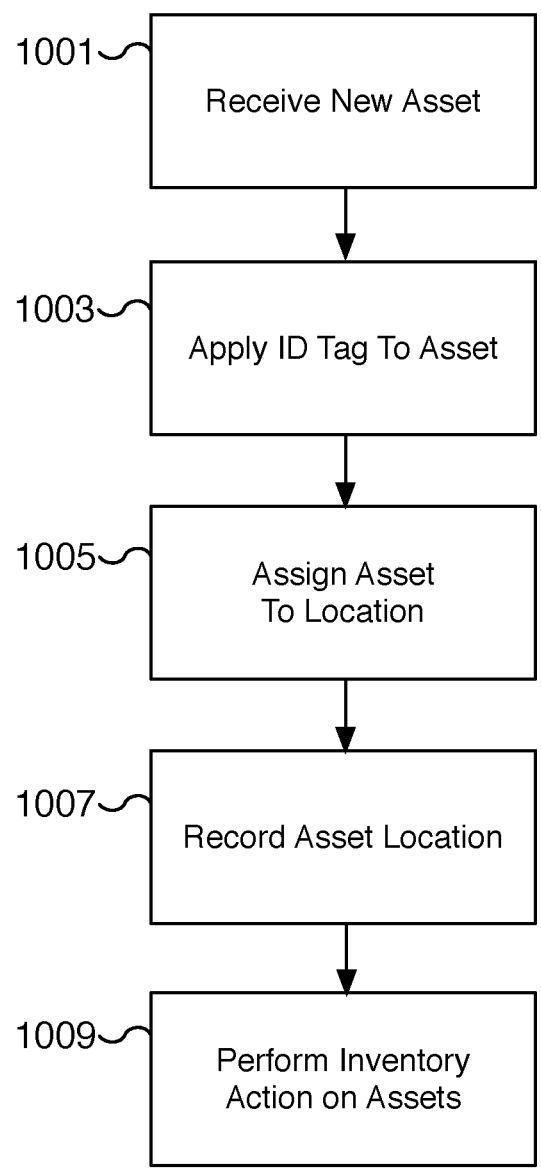
FIG. 10 is a flow diagram illustrating an embodiment of a process for performing radio-frequency identification (RFID)-based shelf-level inventory counting.

FIG. 10 is a flow diagram illustrating an embodiment of a process for performing radio-frequency identification (RFID)-based shelf-level inventory counting. For example, the process of FIG. 10 may be utilized to incorporate shelf-level inventory counting to track assets. In various embodiments, the process of FIG. 10 utilizes the processes of FIGS. 7, 8, and 9. In some embodiments, the process of FIG. 10 is performed by asset server 105 of FIG. 1 using RFID readers 103, 113, and 123 of FIG. 1 to detect RFID tags on assets stored in rack pairs 101, 111, and 121 of FIG. 1. In various embodiments, information associated with the assets, including the expected location of assets, mappings for converting a storage location to an XYZ location, and mappings for converting from degrees of separation to reductions in confidence levels, is stored in database 107 of FIG. 1.

At 1001, a new asset is received. For example, a new asset may be received in a loading dock with the intention of adding the new asset to inventory. At 1003, a radio-frequency identification (RFID) tag is applied to the asset. For example, an RFID tag is physically adhered to the asset. In some embodiments, the asset is stored in a bin and the RFID tag is applied to the bin. In various embodiments, the RFID tag includes and/or is associated with a unique asset tag identifier. In some embodiments, the RFID tag further includes a product number, a part number, a serial number, and/or product identifier, as appropriate.

At 1005, the asset is assigned to a storage location. In various embodiments, the storage location is identified at a shelf-level granularity. For example, the storage location includes a rack, a shelf height, and a rack depth that corresponds to an X-axis value, Y-axis value, and Z-axis value. The asset is placed at the storage location. In some embodiments, the asset is stored in a bin at the storage location. In some embodiments, a receipt of the assets stored in the bin is included with the bin. In various embodiments, the asset is stored on the rack, at the rack shelf level, and at the rack depth corresponding to the storage location.

At 1007, the asset location is recorded. For example, an asset server, such as asset server 105 of FIG. 1, stores the asset location as an expected location for the asset in a database such as database 107 of FIG. 1. In some embodiments, the location information is stored using an abbreviated name such as a number and letter pair (e.g., A1, A2, A3, B2, R3, etc.) as shown in FIGS. 1, 3, and 4. In various embodiments, the expected location is stored with an asset unique identifier.

At 1009, an inventory action is performed on the stored assets. For example, a shelf-level inventory count is performed on the assets stored in a particular storage room. The inventory count detects each of the assets in the storage room and determines whether the detected shelf-level location matches the expected shelf-level location. Matched assets, mismatched assets, and missing assets may be included in the inventory report. An actionable report may be issues based on the inventory count. For example, misplaced or missing assets are identified and operators are assigned to identify and locate the misplaced or missing assets. In some embodiments, a small number of matched assets are included in the actionable report as spot checks. Operators are asked to confirm the location of a select set of matched assets to verify the matched results are correct.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   detecting a radio frequency identification tag at a plurality of detection locations including by receiving a radio frequency signal of the radio frequency identification tag at a plurality of radio frequency identification tag reader antennas coupled to one or more radio frequency identification tag readers in communication with one or more servers;
   determining an expected location of the radio frequency identification tag;
   determining a corresponding relative location confidence level for each of the detection locations of the radio frequency identification tag based on a relative location of the corresponding detection location as compared to the expected location, wherein the each corresponding relative location confidence level is determined based on a plurality of different confidence level adjustment factors that vary across different magnitudes of separation from the expected location and vary across different directional axes;
   analyzing the determined relative location confidence levels of the same radio frequency identification tag for the detection locations to automatically select at least one of the detection locations; and
   performing an action based on the at least one selected detection location.

2. The method of claim 1, wherein the at least one of the selected detection locations is determined irrespective of a detected signal strength of the radio frequency identification tag.

3. The method of claim 1, wherein the expected location is stored in a remote data store.

4. The method of claim 1, wherein each of the at least one selected detection locations identifies a rack, a rack shelf level, and a rack depth.

5. The method of claim 1, wherein the relative location includes an X-axis component, a Y-axis component, and a Z-axis component.

6. The method of claim 5, wherein each of the relative location confidence levels are based on degrees of separation associated with the corresponding X-axis, Y-axis, and Z-axis components.

7. The method of claim 1, wherein the radio frequency identification tag is associated with an inventory asset.

8. The method of claim 1, wherein each of the detection locations and the expected location are associated with a corresponding three-dimensional location.

9. The method of claim 1, wherein the at least one of the selected detection locations is a single selected location.

10. The method of claim 9, wherein the single selected location corresponds to a detection location with a maximum confidence level.

11. The method of claim 9, wherein performing the action based on the at least one selected detection location is based at least in part on the determined confidence level of the single selected location.

12. The method of claim 9, wherein in response to a determination that the determined confidence level of the single selected location exceeds a threshold value, an inventory asset associated with the radio frequency identification tag is identified as correctly placed.

13. The method of claim 9, wherein in response to a determination that the determined confidence level of the single selected location does not exceed a threshold value, an inventory asset associated with the radio frequency identification tag is identified as misplaced and one or more of the plurality of detection locations are provided as a list of potential locations for locating the inventory asset.

14. The method of claim 1, wherein detecting the radio frequency identification tag at the plurality of detection locations includes aggregating multiple read cycles.

15. The method of claim 14, wherein the multiple read cycles complete in an hour or less.

16. The method of claim 14, wherein aggregating multiple read cycles includes powering the radio frequency identification tag for reading at least fifteen times over a duration of the multiple read cycles.

17. The method of claim 1, wherein performing the action includes a creating of an inventory report.

18. The method of claim 17, wherein in response to a determination that the determined confidence levels of the at least one of the selected detection locations does not exceed a threshold value, an inventory asset associated with the radio frequency identification tag is included in the inventory report and marked for inspection.

19. A system comprising:
   a processor; and
   a memory coupled with the processor, wherein the memory is configured to provide the processor with instructions which when executed cause the processor to:
      detect a radio frequency identification tag at a plurality of detection locations using a plurality of radio frequency identification tag reader antennas coupled to one or more radio frequency identification tag readers in communication with one or more servers;
      determine an expected location of the radio frequency identification tag;
      determine a corresponding relative location confidence level for each of the detection locations of the radio frequency identification tag based on a relative location of the corresponding detection location as compared to the expected location, wherein the each corresponding relative location confidence level is determined based on a plurality of different confidence level adjustment factors that vary across different magnitudes of separation from the expected location and vary across different directional axes;
      analyze the determined relative location confidence levels of the same radio frequency identification tag; and
      perform an action based on the at least one selected detection location.

20. A computer program product, the computer program product being embodied in a non-transitory computer readable storage medium and comprising computer instructions for:
   detecting a radio frequency identification tag at a plurality of detection locations using a plurality of radio frequency identification tag reader antennas coupled to one or more radio frequency identification tag readers in communication with one or more servers;
   determining an expected location of the radio frequency identification tag;
   determining a corresponding relative location confidence level for each of the detection locations of the radio frequency identification tag based on a relative location of the corresponding detection location as compared to the expected location, wherein the each corresponding relative location confidence level is determined based on a plurality of different confidence level adjustment factors that vary across different magnitudes of separation from the expected location and vary across different directional axes;
   analyzing the determined relative location confidence levels of the same radio frequency identification tag for the detection locations to automatically select at least one of the detection locations; and
   performing an action based on the at least one selected detection location.

* * * * *